(12) United States Patent
Inomoto

(10) Patent No.: US 12,128,618 B2
(45) Date of Patent: Oct. 29, 2024

(54) THREE-DIMENSIONAL PRINTING SUPPORT DEVICE, AND METHOD FOR MANUFACTURING THREE-DIMENSIONAL PRINTED ARTICLE

(71) Applicant: MITSUBISHI HEAVY INDUSTRIES, LTD., Tokyo (JP)

(72) Inventor: Makoto Inomoto, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 247 days.

(21) Appl. No.: 17/779,229

(22) PCT Filed: Nov. 11, 2020

(86) PCT No.: PCT/JP2020/042001
§ 371 (c)(1),
(2) Date: May 24, 2022

(87) PCT Pub. No.: WO2021/124734
PCT Pub. Date: Jun. 24, 2021

(65) Prior Publication Data
US 2022/0402208 A1 Dec. 22, 2022

(30) Foreign Application Priority Data
Dec. 17, 2019 (JP) .................. 2019-227448

(51) Int. Cl.
*B29C 64/245* (2017.01)
*B29C 64/393* (2017.01)
(Continued)

(52) U.S. Cl.
CPC .......... *B29C 64/245* (2017.08); *B29C 64/393* (2017.08); *B33Y 30/00* (2014.12);
(Continued)

(58) Field of Classification Search
CPC ... B29C 64/245; B29C 64/393; B29C 64/286; B29C 64/118; B33Y 30/00; B33Y 10/00; B33Y 50/00; B33Y 50/02; Y02P 10/25
(Continued)

(56) References Cited

U.S. PATENT DOCUMENTS 6,490,496 B1   12/2002  Dacey
2020/0079018 A1  3/2020  Zhou et al.
(Continued)

FOREIGN PATENT DOCUMENTS

DE   102019123748   3/2020
DE   102018219096   5/2020
(Continued)

OTHER PUBLICATIONS

Hirano et al., JP 2016-150466, published Aug. 22, 2016, machine translation to English (Year: 2016).*
(Continued)

*Primary Examiner* — Galen H Hauth
*Assistant Examiner* — Lawrence D. Hohenbrink, Jr.
(74) *Attorney, Agent, or Firm* — Wenderoth, Lind & Ponack, L.L.P.

(57) ABSTRACT

A three-dimensional printing support device includes: a variable table which includes an installation surface, and has a configuration configured to enable a shape of the installation surface to be freely modified; a drive unit for: (i) driving the variable table to change the shape of the installation surface; and a control unit for acquiring shape data relating to a shape of a printed article, which is a printing target; and (ii) controlling the drive unit based on the shape data such that the shape of the installation surface corresponds to the shape of the printed article.

16 Claims, 7 Drawing Sheets

(51) Int. Cl.
    *B33Y 30/00*     (2015.01)
    *B33Y 50/02*     (2015.01)
    *B29C 64/118*        (2017.01)
    *B29C 64/286*        (2017.01)
    *B33Y 10/00*         (2015.01)
    *B33Y 50/00*         (2015.01)

(52) U.S. Cl.
    CPC ............. *B33Y 50/02* (2014.12); *B29C 64/118* (2017.08); *B29C 64/286* (2017.08); *B33Y 10/00* (2014.12); *B33Y 50/00* (2014.12); *Y02P 10/25* (2015.11)

(58) Field of Classification Search
    USPC .......................................................... 264/308
    See application file for complete search history.

(56) References Cited

U.S. PATENT DOCUMENTS

| | | | |
|---|---|---|---|
| 2020/0263046 A1 | 8/2020 | Yoshimura | |
| 2020/0329814 A1* | 10/2020 | Wang | A43B 17/006 |
| 2021/0197462 A1* | 7/2021 | Brochier | B29C 64/232 |
| 2021/0283856 A1* | 9/2021 | Chen | B29C 64/124 |

FOREIGN PATENT DOCUMENTS

| | | |
|---|---|---|
| JP | 11-281328 | 10/1999 |
| JP | 2001-58357 | 3/2001 |
| JP | 2004-306176 | 11/2004 |
| JP | 2011056878 A * | 3/2011 |
| JP | 2016150466 A * | 8/2016 |
| JP | 2019-64258 | 4/2019 |
| JP | 2019-89323 | 6/2019 |
| JP | 2020032552 A * | 3/2020 |
| WO | 2017/180958 | 10/2017 |
| WO | 2018/143917 | 8/2018 |
| WO | 2018/223043 | 12/2018 |

OTHER PUBLICATIONS

Yasui et al., JP 2011-056878-A, published Mar. 24, 2011, machine translation to English (Year: 2011).*
Hyoji et al., JP-2020032552-A, published Mar. 5, 2020, machine translation to English (Year: 2020).*
International Search Report issued Dec. 22, 2020 in corresponding International Application No. PCT/JP2020/042001.
Office Action issued Nov. 7, 2023 in corresponding German Application No. 112020006117.5 with English translation.

* cited by examiner

THREE-DIMENSIONAL PRINTING SUPPORT DEVICE, AND METHOD FOR MANUFACTURING THREE-DIMENSIONAL PRINTED ARTICLE

BACKGROUND OF THE INVENTION

1. Field of the Invention

The present disclosure relates to a three-dimensional printing support device, and a method for manufacturing a three-dimensional printed article.

2. Description of Related Art

A printed article can be manufactured (printed) by using a 3D printer, for example. As an additive manufacturing (AM) technique for performing three-dimensional (3D) printing, a plurality of methods are used. In the plurality of methods, a fused filament fabrication (FFF) method or a fused deposition modeling (FMD) method has the following advantages. A device configuration is simple, and manufacturing costs are low. In addition, a printed article can be formed of a composite material by combining a synthetic resin and a continuous fiber with each other.

In the related art, as illustrated in FIG. 10, a 3D printer (three-dimensional lay-up printing device) 100 includes a housing 101, a printing table 102 for printing which is provided inside the housing 101, and a printing head 103 provided above the printing table 102. A printed article M is printed on the printing table 102. A reel 104 is provided outside the housing 101. For example, a filament 105 for the printed article M formed of the synthetic resin formed as a printing material and a filament 106 for a support material are respectively wound around one end side of the reel 104. The other end sides of the filaments 105 and 106 are respectively connected to the printing head 103 so that the filaments 105 and 106 can be supplied to the printing head 103.

FIG. 11 is a schematic view illustrating a state where the filament is extruded by the 3D printer 100 in FIG. 10. In FIG. 11, for convenience of description, the printing head 103 in FIG. 10 is omitted in the illustration. As illustrated in FIG. 11, a nozzle 107 for ejecting the filament 105 is provided in the 3D printer 100. The nozzle 107 ejects a supplied filament 105' in a molten or semi-molten state to be linearly extruded onto the printing table 102. The ejected filament 105' is cooled and solidified to form a layer having a predetermined shape. An operation for ejecting the filament 105' is repeatedly performed on the formed layer so that the filament 105' is extruded from the nozzle 107, thereby forming a three-dimensional printed article.

According to the fused filament fabrication (FFF) method or the fused deposition modeling (FMD) method described above, the filaments (printed article materials) formed of the synthetic resin are stacked one by one from a lower side. Therefore, the support material needs to be printed in a portion (overhang portion) having a shape in which an upper portion projects from a lower portion. A portion to be printed in the upper portion is supported by the support material. Therefore, it is possible to form the printed article having a complicated shape.

However, the support material is an unnecessary portion after the printed article is printed. Therefore, work for removing the support material needs to be carried out. Japanese Unexamined Patent Application Publication Nos. 2019-64258 and 2019-89323 disclose a technique for dissolving and removing the support material by using a solvent.

BRIEF SUMMARY OF THE INVENTION

According to the FFF method or the FMD method, the support material needs to be printed. Therefore, a printing time and printing costs increase. In addition, the support material is printed in a state of being in contact with the printed article. Therefore, shape accuracy and mechanical properties of the printed article printed on the support material is deteriorated.

In addition, when the support material is removed, there are two methods such as a method of breaking and detaching the support material through manual work (breakaway) and a method of dissolving and removing the support material by using a solvent (soluble). However, in either method, it takes time and effort to remove the support material. Accordingly, there is a problem in that a manufacturing cost increases and whole process requires a lot of time.

The present disclosure is made in view of the above-described circumstances, and an object thereof is to provide a three-dimensional printing support device, and a method for manufacturing a three-dimensional printed article, which can quickly and easily form a printed article without using a support material in three-dimensional printing.

According to the present disclosure, in order to solve the above-described problems, a three-dimensional printing support device, and a method for manufacturing a three-dimensional printed article adopt the following means.

According to the present disclosure, there is provided a three-dimensional printing support device including a variable table having an installation surface and having a configuration which enables a shape of the installation surface to be freely changed, a drive unit that drives the variable table to change the shape of the installation surface, and a control unit that acquires shape data relating to a shape of a printed article which is a printing target, and that controls the drive unit so that the shape of the installation surface matches a shape corresponding to a surface shape of the printed article, based on the acquired shape data.

According to the present disclosure, there is provided a method for manufacturing a three-dimensional printed article. The method includes a step of driving a variable table having an installation surface and having a configuration which enables a shape of the installation surface to be freely changed, a step of changing a shape of the installation surface so that the shape of the installation surface matches a shape corresponding to a surface shape of the printed article, based on shape data relating to a shape of a printed article which is a printing target, and a step of stacking a material for forming a three-dimensional printed article on the variable table in which the shape of the installation surface is changed.

According to the present disclosure, a printed article can be quickly and easily formed without using a support material in three-dimensional printing.

DETAILED DESCRIPTION OF THE INVENTION

Figure 1:
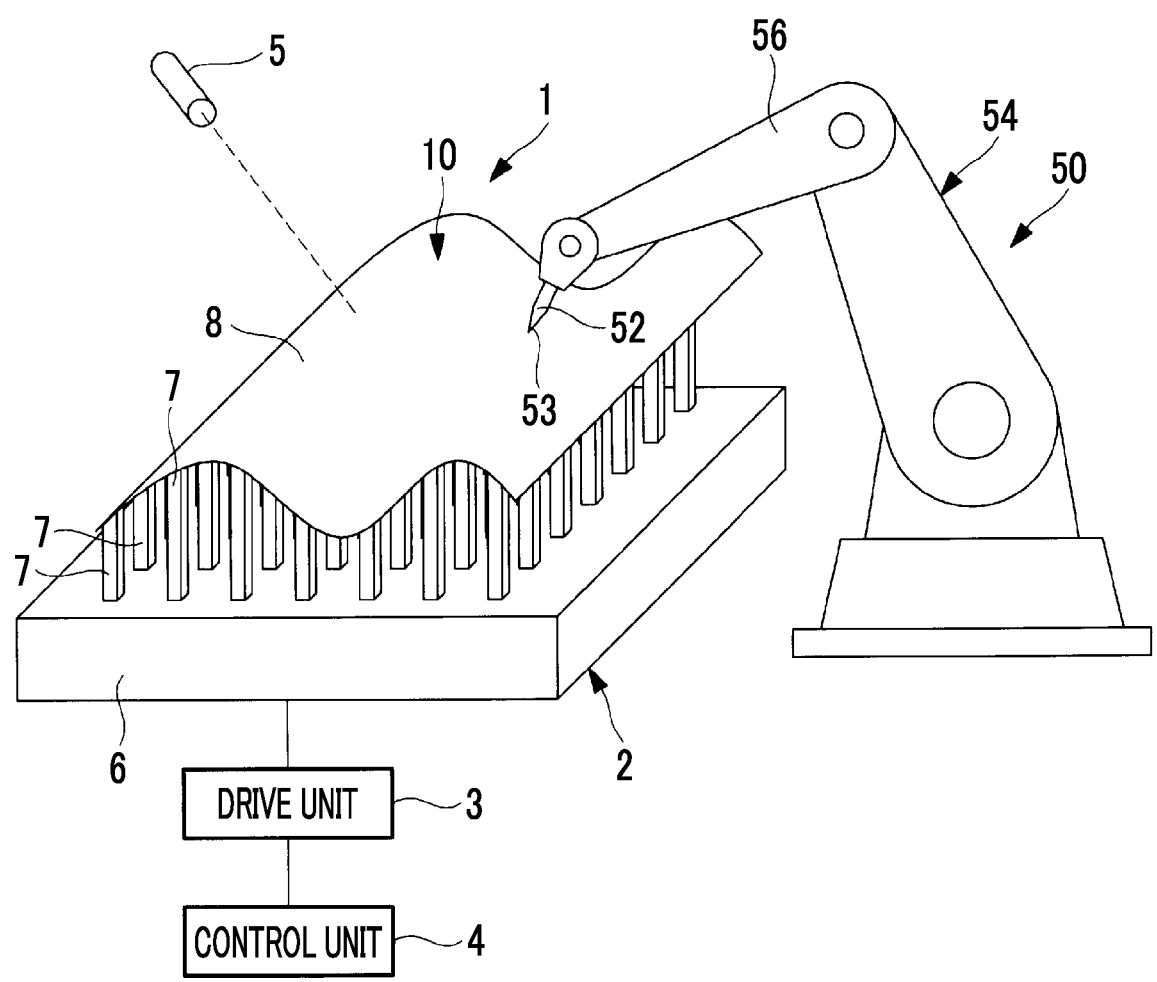
FIG. 1 is a schematic view illustrating a three-dimensional printing support device and a three-dimensional printing device according to an embodiment of the present disclosure.
Figure 4:
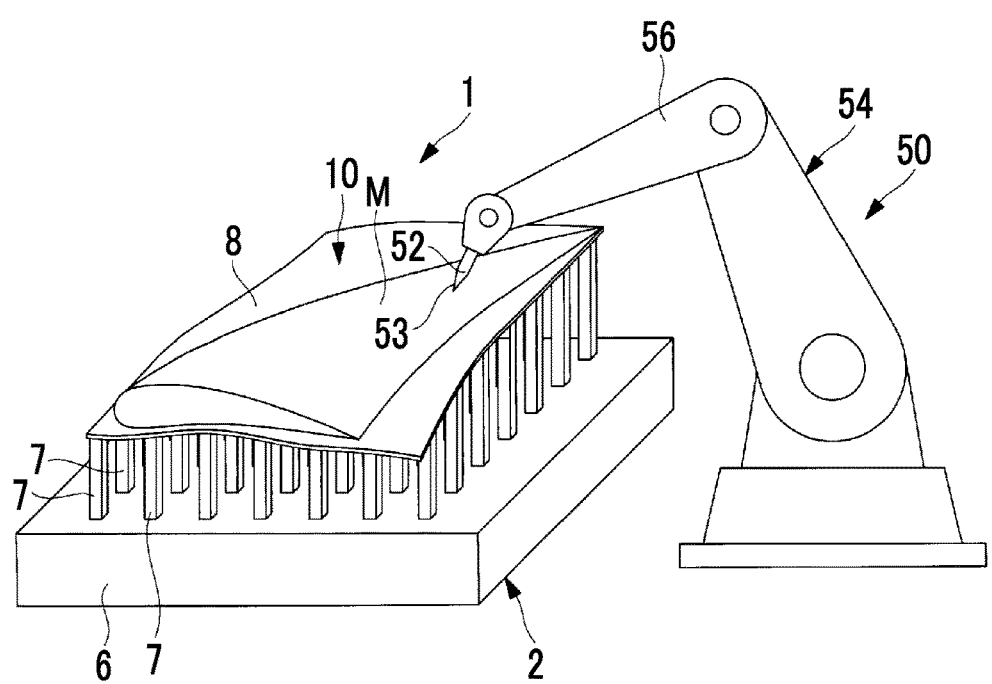
FIG. 4 is a schematic view illustrating the three-dimensional printing support device, the three-dimensional printing device, and a printed article according to the embodiment of the present disclosure.

A three-dimensional printing support device 1 according to an embodiment of the present disclosure is applied to three-dimensional (3D) printing by using an additive manufacturing (AM) technique using a three-dimensional printing device 50. For example, the three-dimensional printing device (3D printer) 50 is a printing device using a fused filament fabrication (FFF) method or a fused deposition modeling (FDM) method. As illustrated in FIGS. 1 and 4, filaments are stacked on an installation surface 10 of the three-dimensional printing support device 1 by the three-dimensional printing device 50, thereby forming a target printed article M. FIG. 4 illustrates a case where the printed article M is a vane having a curved surface, for example, a vane surface.

As illustrated in FIG. 1, the three-dimensional printing support device 1 includes a variable table 2, a drive unit 3, a control unit 4, and a measuring unit 5.

For example, the variable table 2 has an installation surface 10 having a rectangular shape in a plan view, and has a configuration which enables a shape of the installation surface 10 to be freely changed. Specifically, the installation surface 10 can be deformed to have not only a planar shape but also a curved surface shape. The variable table 2 may have any configuration as long as the shape of the installation surface 10 can be deformed and the shape can be maintained when printing is performed by the three-dimensional printing device 50.

Figure 2A:
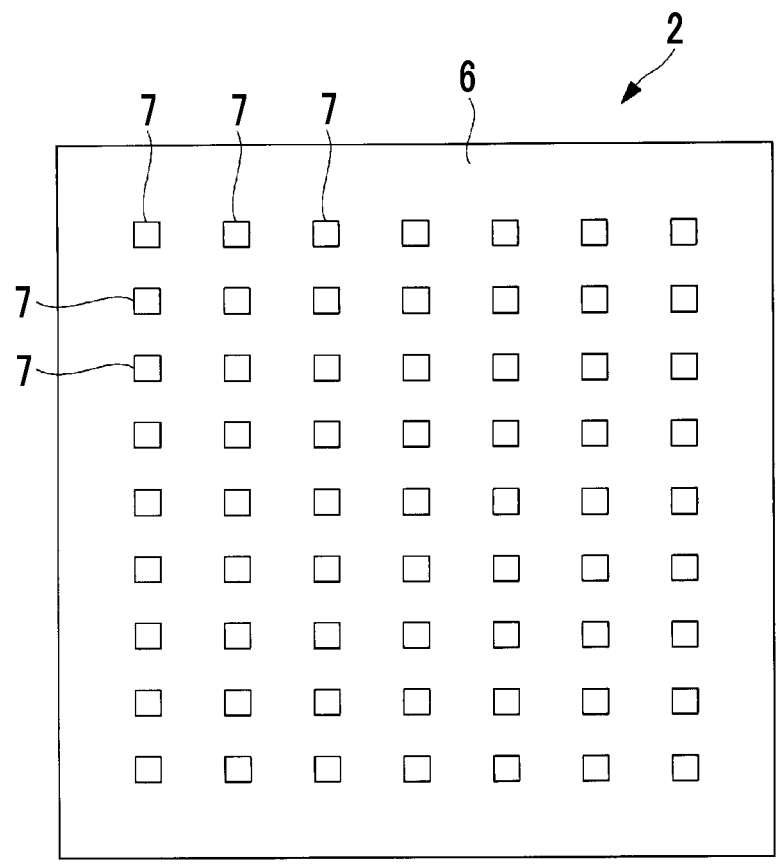
FIG. 2A is a plan view illustrating a support table and a column of a variable table according to the embodiment of the present disclosure.
Figure 2B:
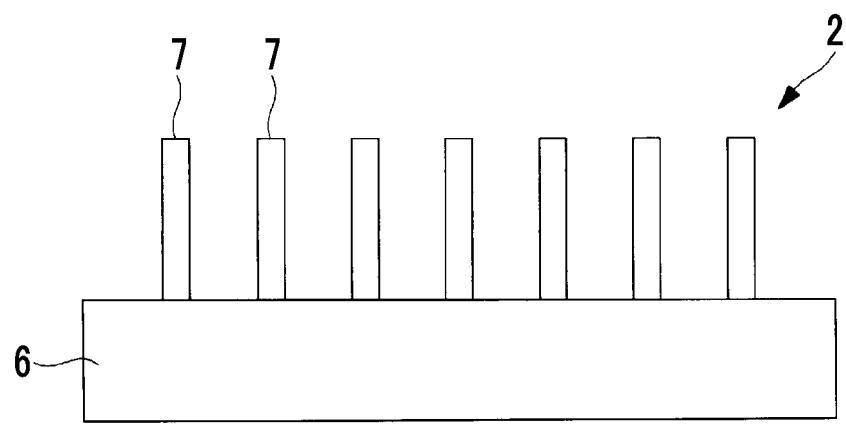
FIG. 2B is a side view illustrating the support table and the column of the variable table according to the embodiment of the present disclosure.
Figure 3:
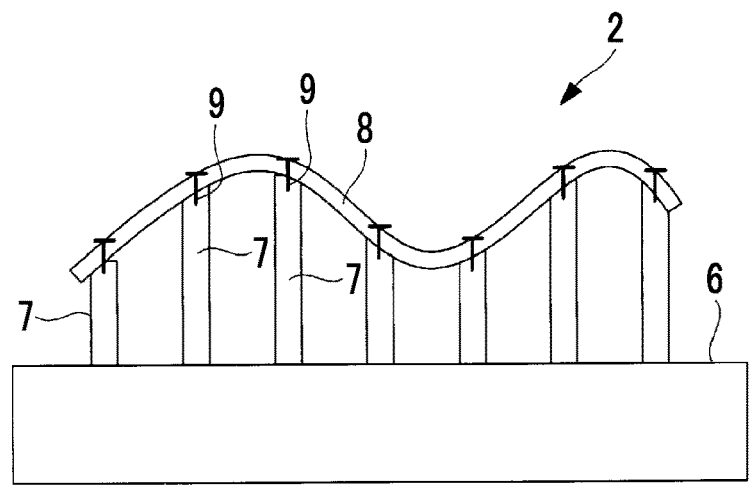
FIG. 3 is a schematic view illustrating the variable table according to the embodiment of the present disclosure.

As illustrated in FIGS. 2A, 2B, and 3, for example, the variable table 2 has a support table 6, a plurality of columns 7, and a surface portion 8. The support table 6 supports lower portions of the plurality of columns 7. As will be described later, in the support table 6, the plurality of columns 7 are disposed at a predetermined interval so that a basic unit is formed of several (for example, three, four, or six) columns as a set.

As illustrated in FIGS. 2A and 2B, the column 7 is a rod-printed member, and is provided in the support table 6. The plurality of columns 7 are provided so that each axial direction extends in a vertical direction, and have a configuration expandable/contractable along the axial direction.

For example, an expanding/contracting function of the column 7 is realized by configuring the column 7 to be movable into and out from the support table 6 in the vertical direction. In addition, the expanding/contracting function of the column 7 may be realized by dividing the column 7 into a plurality of members in the axial direction and configuring the divided members having different diameters to be movable into and out from each other.

After the column 7 expands and contracts, a fastener such as a bolt or a magnet is used to fix a position of the column 7 in an expanding/contracting direction. The position of the column 7 in the expanding/contracting direction is adjusted to change a shape of the surface portion 8 provided in a tip of the column 7, that is, a shape of the installation surface 10.

The surface portion 8 is a film-like member, is installed in the tips of the plurality of columns 7, and forms the installation surface 10 on a surface opposite to a side connected to the column 7. As illustrated in FIG. 3, the surface portion 8 and the tip of each of the columns 7 are coupled by a fastener 9 such as a bolt, for example. In this manner, the surface portion 8 is deformed depending on an expanding/contracting position of the column 7.

For example, the surface portion 8 has elasticity. In this manner, the installation surface 10 formed by the surface portion 8 is more freely deformable, and it is possible to cope with both a case where the shape of the printed article to be formed has a gentle curved surface and a case where the shape has a steep curved surface. For example, a rubber material or a mesh-printed material is used to allow the surface portion 8 to have elasticity.

It is desirable that the surface portion 8 is formed of a heat-resistant material. In this manner, the installation surface 10 formed by the surface portion 8 has heat resistance, and can be used even when a material for forming the printed article, for example, a filament, is used at a high temperature. For example, in the 3D printer using the FFF method, when the printing is performed, a nozzle temperature is 200° C. to 500° C., an atmospheric temperature is a room temperature to 300° C., and a table temperature is a room temperature to 200° C. In the variable table 2, there is a possibility that local heating by a laser may occur. As the surface portion 8, it is desirable to use a metal sheet, a heat-resistant resin sheet, a heat-resistant rubber sheet, or a sheet having a composite structure thereof.

The drive unit 3 drives the variable table 2 to change a shape of the installation surface 10. The drive unit 3 receives a drive signal from the control unit 4, and drives the variable table 2, based on the received drive signal. In the above-described example, the drive unit 3 drives the column 7 of the variable table 2, based on the drive signal.

The control unit 4 acquires shape data relating to a shape of the printed article which is a printing target. For example, the shape data is design data of the printed article, and has position information on three-dimensional coordinates. The control unit 4 acquires shape data via a recording medium such as a memory or via communication. Based on the acquired shape data, the control unit 4 selects the shape data of a portion coming into contact with the variable table 2 in a surface shape of the printed article, for example, a surface shape on a bottom surface side of the printed article. Based on the acquired and selected shape data, the control unit 4 generates a drive signal for driving the drive unit 3 so that the shape of the installation surface 10 matches the surface shape of the printed article, for example, a shape corresponding to the surface shape on the bottom surface side of the printed article (shape obtained by transferring the surface shape on the bottom surface side). The control unit 4 transmits the generated drive signal to the drive unit 3. Based on the acquired shape data, the control unit 4 controls the drive unit 3 so that the shape of the installation surface 10 matches a shape corresponding to the surface shape of the printed article.

For example, the control unit 4 is configured to include a central processing unit (CPU), a random access memory (RAM), a read only memory (ROM), and a computer-readable non-temporary storage medium. Then, as an example, a series of processes for realizing various functions are stored in the storage medium in a form of a program. The CPU reads the program in the RAM, and executes information processing and arithmetic processing. In this manner, various functions are realized. The program may adopt a form in which the program is installed in advance in the ROM or another storage medium, a form in which the program is provided in a stored state in a computer-readable storage medium, or a form in which the program is delivered via wired or wireless communication means. The computer-readable storage medium is a magnetic disc, a magneto-optical disc, a CD-ROM, a DVD-ROM, or a semiconductor memory.

As illustrated in FIG. 1, the measuring unit 5 is installed above the variable table 2, and measures the shape of the installation surface 10. For example, the measuring unit 5 is a non-contact optical measuring device. The measuring unit 5 transmits information relating to the shape of the installation surface 10 which is a measurement result to the control unit 4.

The control unit 4 receives information relating to the shape of the installation surface 10, which is a measurement result, from the measuring unit 5. The control unit 4 controls the drive unit 3, based on the information relating to the shape of the installation surface 10 measured by the measuring unit 5 and on the shape data such as the acquired design data.

In this manner, the shape of the installation surface 10 of the variable table 2 which is changed by the drive unit 3 is measured by the measuring unit 5. The drive unit 3 is controlled by the control unit 4, based on the shape data of the installation surface 10 measured by the measuring unit 5 and on the acquired shape data. For example, a difference between the shape of the installation surface 10 of the variable table 2 and the shape on the bottom surface side of the printed article is calculated, and the column 7 is driven to change a position of the column 7 of the variable table 2, based on the calculated difference, and the shape of the installation surface 10 is adjusted. Feedback control of the position of the column 7 is performed so that the shape of the installation surface 10 is accurately adjusted to correspond to the shape data relating to the shape on the bottom surface side of the printed article.

Next, a disposition position of the column 7 will be described. With regard to the disposition position of the columns 7, a formed shape of the printed article is accurately formed when an interval between the columns 7 and a shape of a basic unit formed on a plane are taken into consideration. The basic unit is a smallest shape formed by connecting vertices of the plurality of columns 7, and the basic units are repeatedly disposed in the variable table 2. As a resolution of a disposition shape of the column 7 becomes higher, the formed shape of the printed article is relatively accurately formed. On the other hand, as the resolution becomes lower, the formed shape of the printed article is relatively coarsely formed.

Figure 5:
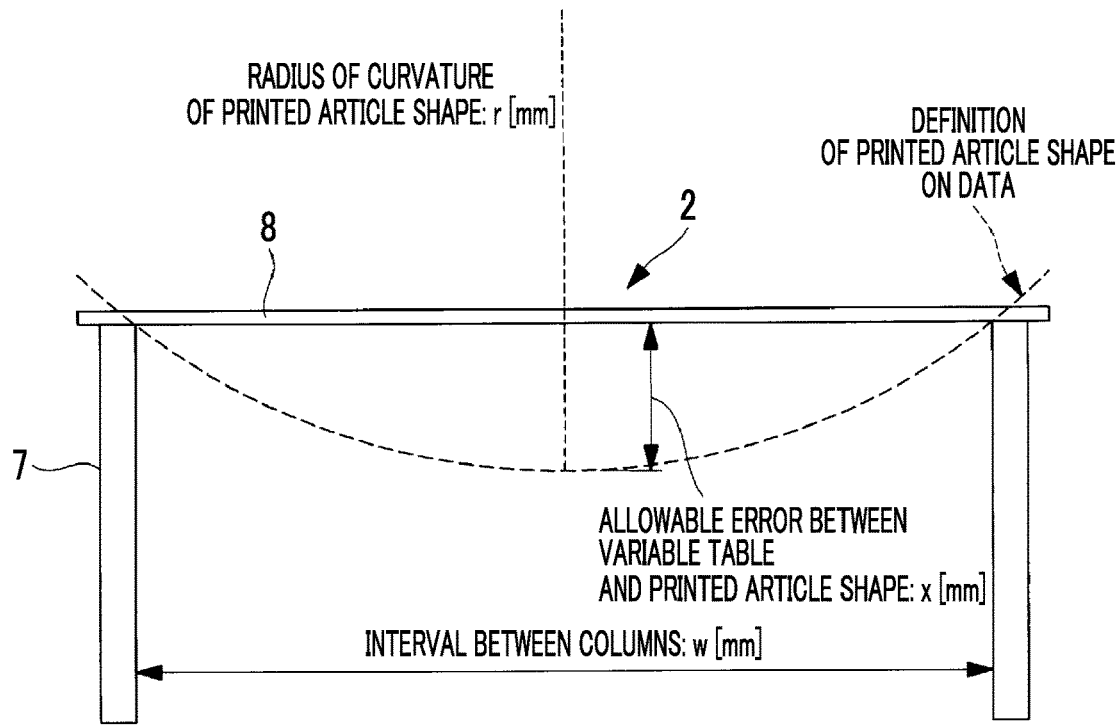
FIG. 5 is a view for describing the column and a surface portion of the variable table according to the embodiment of the present disclosure.

With regard to the disposition position of the columns 7, the interval between the columns 7 will be described with reference to FIG. 5. For example, the interval between the adjacent columns 7 is determined, based on a target shape formed by the installation surface 10 and on an error amount allowable in the shape of the printed article to be formed.

Accuracy of a curved surface formed by the installation surface 10 of the variable table 2 is changed depending on a size of the above-described basic unit. That is, the interval between the adjacent columns 7 affects whether the resolution of the disposition shape of the columns 7 is high or low. For example, the interval between the adjacent columns 7 is determined, based on a minimum radius of curvature of the target shape formed by the installation surface 10 and on the error amount allowable in the shape of the printed article to be formed. In this case, for example, the interval between the columns 7 is calculated by Equation (1) below.

$$w=2\sqrt{2rx-x^2} \qquad (1)$$

Here, w is the interval [mm] between the adjacent columns 7, r is the radius of curvature [mm] of the shape of the printed article, and x is the error amount [mm] allowable in the shape of the printed article to be printed on the variable table 2.

In this manner, for example, when the installation surface 10 having a relatively small radius of curvature is formed or when the printed article having a relatively small allowable error amount is formed, the interval between the columns 7 is narrowed. On the other hand, when the installation surface 10 having a relatively large radius of curvature is formed or when the printed article having a relatively large allowable error amount is formed, the interval between the columns 7 is widened.

Figure 7:
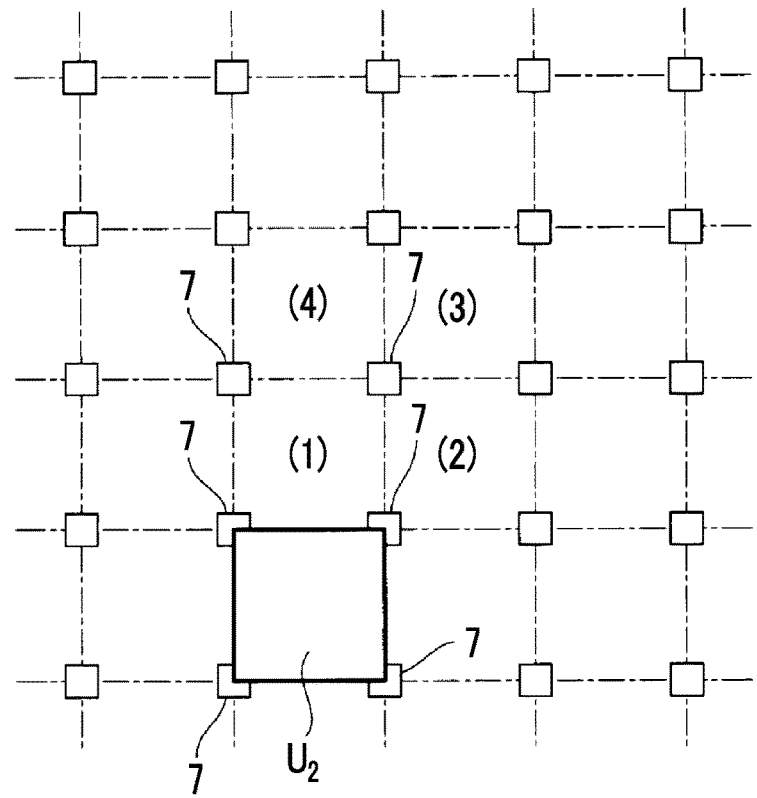
FIG. 7 is a plan view illustrating the column of the variable table according to the embodiment of the present disclosure, and illustrates a case where the basic unit has a square shape.
Figure 8:
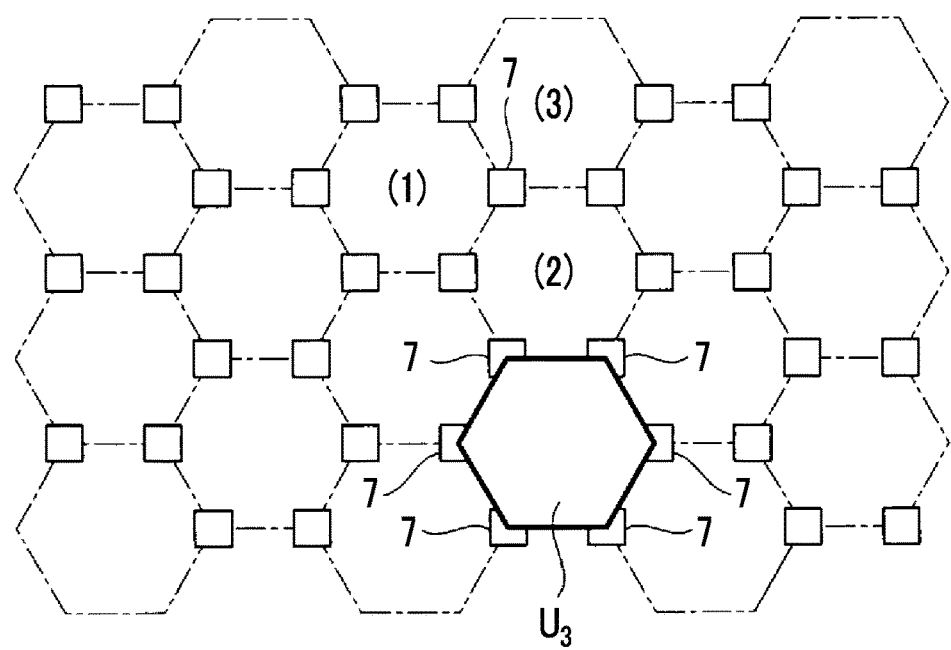
FIG. 8 is a plan view illustrating the column of the variable table according to the embodiment of the present disclosure, and illustrates a case where the basic unit has a regular hexagonal shape.

Next, with regard to the disposition position of the column 7, the shape of the basic unit formed on a plane will be described with reference to FIGS. 6 to 8. The disposition position of the columns 7 is determined by the number of the columns 7 forming the basic unit and by the number of the basic units contributed by one column 7.

When a plane is filled with the plurality of basic units while one basic unit has one type of the shapes and a regular polygonal shape, the shapes of the basic units that can fill the plane are limited to three types such as a regular triangular shape, a square shape, and a regular hexagonal shape. The columns 7 are disposed on the support table 6 to be formed by the basic unit having any of the three types of the shapes.

In order that the shape of the installation surface 10 accurately corresponds to the shape of the printed article to be printed, it is desirable that one basic unit is formed by as many columns 7 as possible. In addition, in order that the shape of the installation surface 10 accurately corresponds to the shape of the printed article to be printed, it is desirable that the number of the basic units contributed by one column 7 is small.

In this manner, for example, when the number of the columns 7 forming the basic unit is large, or when the number of the basic units contributed by one column 7 is small, the shape of the installation surface 10 is more freely deformable. The shape of the installation surface 10 of the variable table 2 can be accurately adjusted to correspond to the shape of the printed article.

Figure 6:
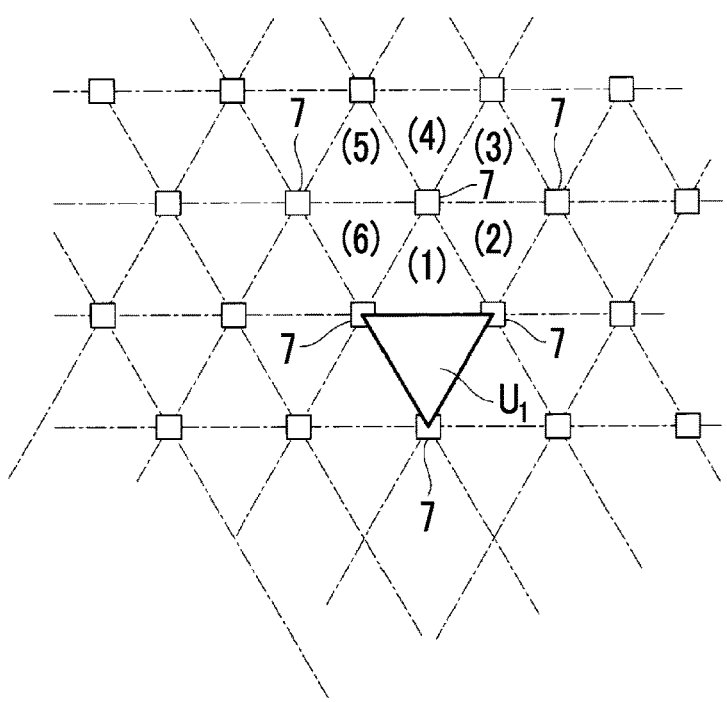
FIG. 6 is a plan view illustrating the column of the variable table according to the embodiment of the present disclosure, and illustrates a case where a basic unit has a regular triangular shape.

As illustrated in FIG. 6, when a basic unit U1 has a regular triangular shape, the number of the columns 7 forming the basic unit U1 is three, and the number of the basic units U1 contributed by one column 7 is six. As illustrated in FIG. 7, when a basic unit U2 has a square shape, the number of the columns 7 forming the basic unit U2 is four, and the number of the basic units U2 contributed by one column 7 is four. As illustrated in FIG. 8, when a basic unit U3 has a regular hexagonal shape, the number of the columns 7 forming the basic unit U3 is 6, and the number of the basic units U3 contributed by one column 7 is 3. The results are summarized in a table below.

TABLE 1

| Shape of Basic Unit | Number of Columns Forming Basic Unit | Number of Basic Units Contributed by Column |
| --- | --- | --- |
| Regular Triangular Shape | 3 | 6 |
| Square Shape | 4 | 4 |
| Regular Hexagonal Shape | 6 | 3 |

Comparing three types of the basic units, when the basic unit has the regular hexagonal shape, the number of the columns 7 forming the basic unit can be maximized, and the number of the basic units contributed by one column 7 can be minimized. Therefore, when the basic unit has the regular hexagonal shape, the shape of the installation surface 10 is more freely deformable, and the shape of the installation surface 10 of the variable table 2 can be accurately adjusted to correspond to the shape of the printed article.

Figure 9:
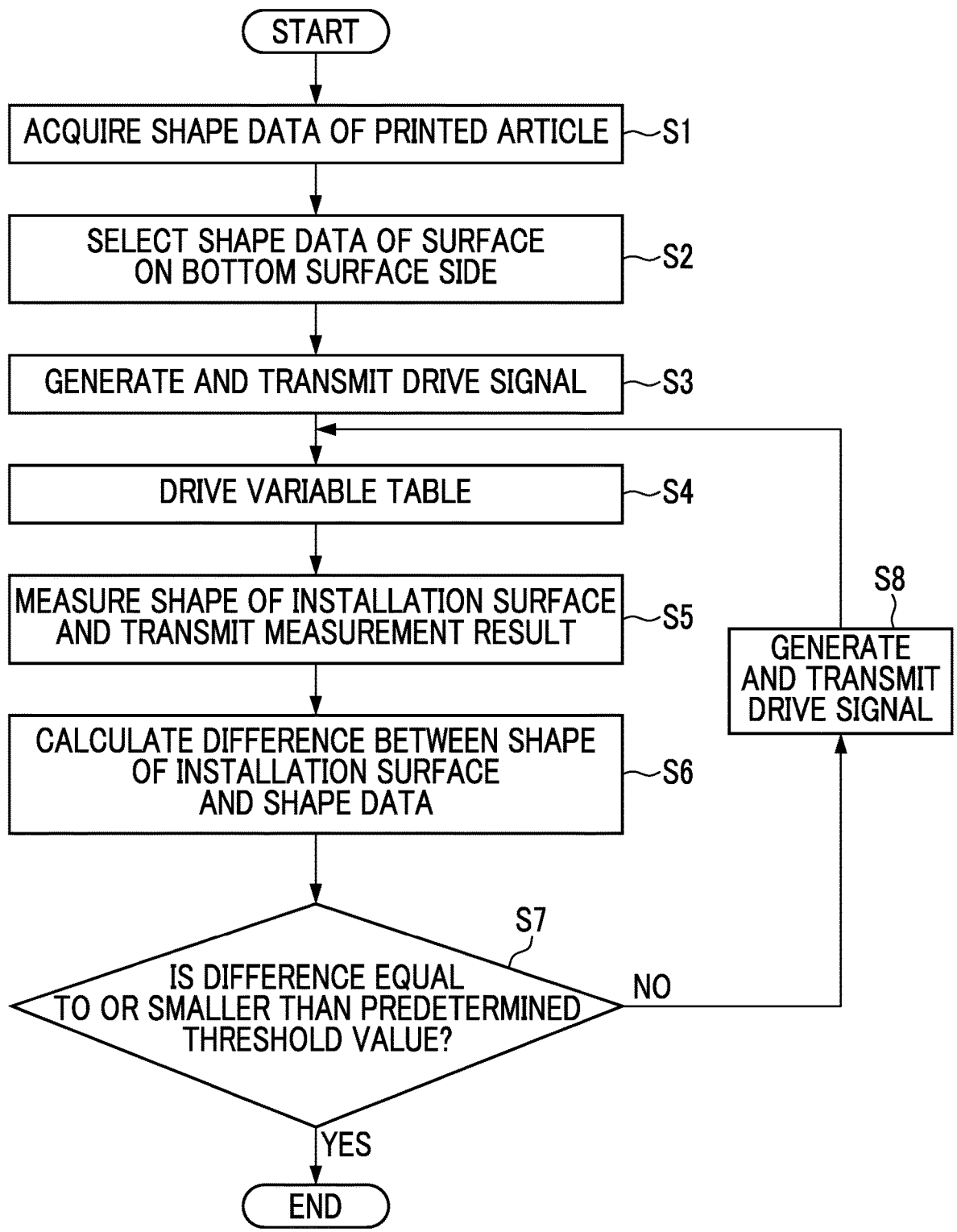
FIG. 9 is a flowchart illustrating an operation of the three-dimensional printing support device according to the embodiment of the present disclosure.
Figure 10:
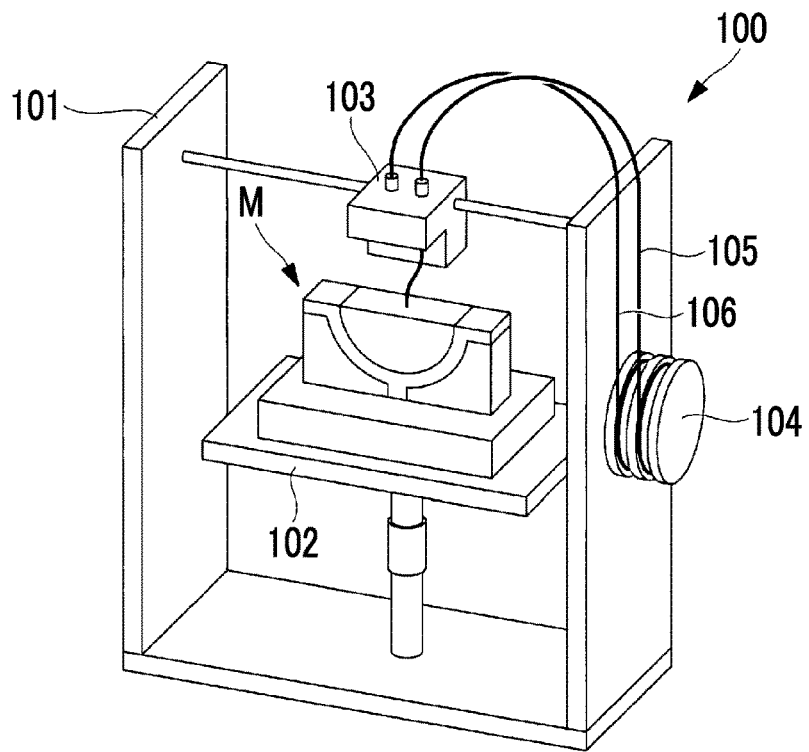
FIG. 10 is a schematic perspective view illustrating an example of a 3D printer using an FFF method in the related art.
Figure 11:
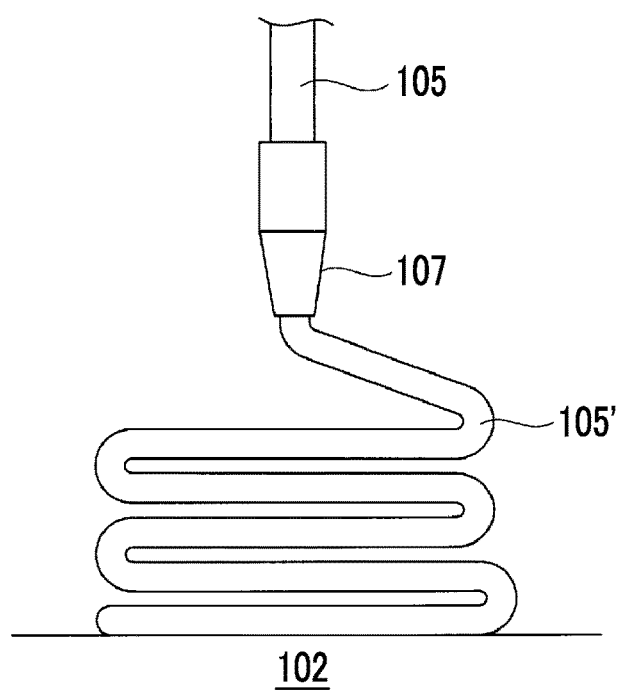
FIG. 11 is a schematic view illustrating a state where a filament is extruded by the 3D printer in the related art in FIG. 10.

Next, an operation of the three-dimensional printing support device 1 according to the present embodiment will be described with reference to FIG. 9.

First, the control unit 4 of the three-dimensional printing support device 1 acquires shape data relating to the shape of the printed article to be printed (Step S1). The shape data may be input to the three-dimensional printing support device 1, and is acquired via a memory or communication.

Next, based on the acquired shape data, the shape data of the surface shape of a portion coming into contact with the variable table 2 in the surface shape of the printed article, for example, the surface shape on the bottom surface side of the printed article is selected (Step S2).

Then, based on the acquired and selected shape data, a drive signal for driving the drive unit 3 is generated so that the shape of the installation surface 10 matches the surface shape of the printed article, for example, a shape corresponding to the surface shape on the bottom surface side of the printed article (shape obtained by transferring the surface shape on the bottom surface side), and the drive signal is transmitted to the drive unit 3 (Step S3).

When the drive unit 3 receives the drive signal from the control unit 4, the variable table 2 is driven, based on the received drive signal (Step S4). In the above-described example, based on the drive signal, the drive unit 3 drives the plurality of columns 7 of the variable table 2, and adjusts a position of each of the columns 7 in the expanding/contracting direction. The surface portion 8 installed in the tips of the plurality of columns 7 is deformed depending on the expanding/contracting position of the column 7.

In this case, the shape of the installation surface 10 is measured from above the variable table 2 by the measuring unit 5 such as a non-contact optical measuring device. Then, information relating to the shape of the installation surface 10, which is a measurement result, is transmitted from the measuring unit 5 to the control unit 4 (Step S5).

Then, the drive unit 3 is further controlled by the control unit 4, based on the shape of the installation surface 10 which is measured by the measuring unit 5 and on the acquired shape data (feedback control). Specifically, a difference between the measured shape of the installation surface 10 and the shape data relating to the shape on the bottom surface side of the printed article is calculated (Step S6), and it is determined whether or not the calculated difference is equal to or smaller than a predetermined threshold value (for example, equal to or smaller than a request error) (Step S7).

When the calculated difference exceeds the predetermined threshold value, based on the calculated difference and the acquired and selected shape data, a drive signal for driving the drive unit 3 is generated so that the shape of the installation surface 10 matches a shape corresponding to the surface shape on the bottom surface side of the printed article that is, so that the error is small. The drive signal is transmitted to the drive unit 3 (Step S8). Then, the plurality of columns 7 of the variable table 2 are driven (Step S4), and the position of the column 7 of the variable table 2 in the expanding/contracting direction is further adjusted. Thereafter, the above-described steps are repeated.

On the other hand, when the difference between the measured shape of the installation surface 10 and the shape data relating to the shape on the bottom surface side of the printed article is equal to or smaller than the predetermined threshold value, it is determined that the installation surface 10 corresponds to the shape data relating to the shape on the bottom surface side of the printed article, and the control of the variable table 2 is completed. In this case, the position of the column 7 in the expanding/contracting direction is fixed by a fastener such as a bolt or a magnet, for example.

Thereafter, the filaments are stacked on the installation surface 10 of the variable table 2 by the three-dimensional printing device 50, thereby forming a target printed article. The printing is performed on the installation surface of the variable table 2. Accordingly, the printed article can be formed into a shape corresponding to the surface shape of the printed article. As a result, even when the surface of the printed article is formed of a curved surface, such as when the shape of the printed article has an overhang portion, three-dimensional printing can be performed without forming the support material.

According to the present embodiment, the support material does not need to be formed together with the printed article. Therefore, it is possible to reduce material costs and printing time. In addition, it is possible to reduce the time and man-hours which are required for removing the support material. Furthermore, in the related art, when the printed article is printed on the support material, the filaments are stacked on an unstable support material. Consequently, shape accuracy or quality of the printed article to be printed are reduced. In contrast, according to the present embodiment, compared to the support material formed of a synthetic resin filament, the variable table 2 is more stable, and the printed article is formed on the stable variable table 2. Therefore, it is possible to improve the shape accuracy or the quality of the printed article to be printed.

In the three-dimensional printing device 50, as illustrated in FIG. 1, for example, a printing head 52 is installed as an end effector in a tip of an arm 56 of a robot device 54. For example, a filament (not illustrated) for the printed article formed of a synthetic resin which is a printing material is wound around a reel (not illustrated). The other end side of each filament is connected to the printing head 52 so that the filament can be supplied to the printing head 52.

A nozzle 53 for ejecting the filament is provided in the printing head 52. The nozzle 53 ejects the supplied filament in a molten or semi-molten state to be linearly extruded onto the variable table 2. The ejected filament is cooled and solidified to form a layer having a predetermined shape. An operation for ejecting the filament is repeatedly performed on the formed layer so that the filament is extruded from the nozzle 53, thereby forming a three-dimensional printed article.

The printing head 52 is installed in the tip of the arm 56 of the robot device 54. In this manner, the printing head 52 can be brought close to the variable table 2 at any desired angle while interference between the printing head 52 and the variable table 2 is avoided.

The three-dimensional printing support device and the method for manufacturing the three-dimensional printed article which are described in each of the above-described embodiments can be understood as follows, for example.

According to the present disclosure, the three-dimensional printing support device (1) includes the variable table (2) having the installation surface (10) and a configuration which enables the shape of the installation surface to be freely changed, the drive unit (3) that drives the variable table to change the shape of the installation surface, and the control unit (4) that acquires the shape data relating to the shape of the printed article which is the printing target, and that controls the drive unit so that the shape of the installation surface matches the shape corresponding to the surface shape of the printed article, based on the acquired shape data.

According to this configuration, the variable table has the installation surface, and has the configuration which enables the shape of the installation surface to be freely changed. The variable table is driven by the drive unit to change the shape of the installation surface. In addition, the control unit acquires the shape data relating to the shape of the printed article which is the printing target, and the drive unit is controlled so that the shape of the installation surface matches the shape corresponding to the surface shape of the printed article, based on the acquired shape data. In this manner, the printed article can be formed into a shape corresponding to the surface shape of the printed article by performing the printing on the installation surface of the variable table. As a result, even when the surface of the printed article is formed of a curved surface, such as when the shape of the printed article has an overhang portion, three-dimensional printing can be performed without forming the support material.

The three-dimensional printing support device according to the above-described disclosure may include the measuring unit (5) that measures the shape of the installation surface, and the control unit may control the drive unit, based on the shape of the installation surface measured by the measuring unit and on the acquired shape data.

According to this configuration, the shape of the installation surface of the variable table changed by the drive unit is measured by the measuring unit, and the drive unit is controlled by the control unit, based on the shape of the installation surface measured by the measuring unit and on the acquired shape data. In this manner, the shape of the installation surface of the variable table is accurately adjusted to correspond to the shape of the printed article.

In the three-dimensional printing support device according to the above-described disclosure, the variable table may include the support table (6), a plurality of support portions (7) formed as rod-printed members respectively provided in the support table, provided so that the axial direction extends in the vertical direction, and having a configuration expandable/contractable along the axial direction, and the surface portion (8) formed as a film-like member, installed in the tips of the plurality of support portions, and forming the installation surface.

According to this configuration, the variable table has the plurality of support portions and the surface portion. The plurality of support portions formed as the rod-printed members respectively provided in the support table are provided so that the axial direction extends in the vertical direction, and are expandable/contractable along the axial direction. The surface portion formed as the film-like member is installed in the tips of the plurality of support portions to form the installation surface. In this manner, the support portion expands and contracts so that the shape of the surface portion is changed. Therefore, the shape of the installation surface is changed.

In the three-dimensional printing support device according to the above-described disclosure, the surface portion may have elasticity.

According to this configuration, the installation surface formed by the surface portion is more freely deformed, and it is possible to cope with both a case where the shape of the printed article to be formed has a gentle curved surface and a case where the shape has a steep curved surface.

In the three-dimensional printing support device according to the above-described disclosure, the surface portion may be formed of a heat-resistant material.

According to this configuration, the installation surface formed by the surface portion has heat resistance, and the surface portion can also be used even when the material for forming the printed article is used at a high temperature.

In the three-dimensional printing support device according to the above-described disclosure, the interval between the adjacent support portions may be determined, based on the target shape formed by the installation surface and on the error amount allowable in the shape of the printed article to be formed.

According to this configuration, for example, when the installation surface having a relatively small radius of curvature is formed or when the printed article having a relatively small allowable error is formed, the interval between the support portions is narrowed. On the other hand, when the installation surface having a relatively large radius of curvature is formed or when the printed article having a relatively large allowable error is formed, the interval between the support portions is widened.

In the three-dimensional printing support device according to the above-described disclosure, the disposition position of the support portion may be determined by the number of the support portions forming the basic unit and by the number of the basic units contributed by one support portion.

According to this configuration, for example, when the number of the support portions forming the basic unit is large or when the number of the basic units contributed by one support portion is small, the shape of the installation surface can be more freely deformed. The shape of the installation surface of the variable table can be accurately adjusted to correspond to the shape of the printed article.

According to the present disclosure, there is provided a method for manufacturing a three-dimensional printed article. The method includes a step of driving a variable table having an installation surface and having a configuration which enables a shape of the installation surface to be freely changed, a step of changing a shape of the installation surface so that the shape of the installation surface matches a shape corresponding to a surface shape of the printed article, based on shape data relating to a shape of a printed article which is a printing target, and a step of stacking a material for forming a three-dimensional printed article on the variable table in which the shape of the installation surface is changed.

The invention claimed is:

1. A method for manufacturing a three-dimensional printed article, the method comprising:
using a driving unit, driving a variable table having an installation surface and a configuration which enables a shape of the installation surface to be freely changed;
using a control unit, changing the shape of the installation surface so that the shape of the installation surface corresponds to a shape of a printed article which is a printing target, based on shape data relating to the shape of the printed article; and
stacking a material for forming the three-dimensional printed article on the variable table in which the shape of the installation surface is changed,
wherein the variable table includes:
a support table;
support portions defined as rod-printed members respectively positioned on the support table so that an axial direction extends in a vertical direction, the support portions having a configuration which is expandable or contractable along the axial direction; and
a surface portion positioned on tips of the support portions, the support portions defining the installation surface,
wherein the control unit is configured to determine a disposition of the support portions by: (i) a number of the support portions defining one basic unit; and (ii) a number of basic units contributed by one of the support portions,
wherein each of the support portions contributes to defining a plurality of basic units; and
wherein the support portions are disposed at a predetermined interval.

2. The method according to claim 1, wherein the surface portion is defined as a film member.

3. The method according to claim 1, wherein the surface portion includes a metal.

4. The method according to claim 1, wherein the surface portion includes a resin.

5. The method according to claim 1, wherein the surface portion includes a rubber.

6. The method according to claim 1, wherein the surface portion is mesh-printed.

7. A three-dimensional printing support device comprising:
a variable table having an installation surface and a configuration configured to enable a shape of the installation surface to be freely changed;
a drive unit configured to drive the variable table to change the shape of the installation surface; and
a control unit configured to: (i) acquire shape data relating to a shape of a printed article which is a printing target; and (ii) control the drive unit so that the shape of the installation surface corresponds to the shape of the printed article, based on the shape data,
wherein the variable table includes:
a support table;
support portions defined as rod-printed members respectively positioned on the support table so that an axial direction extends in a vertical direction, the support portions having a configuration which is expandable or contractable along the axial direction; and
a surface portion positioned on tips of the support portions, the support portions defining the installation surface,
wherein the control unit is configured to determine a disposition of the support portions by: (i) a number of the support portions defining one basic unit; and (ii) a number of basic units contributed by one of the support portions,
wherein each of the support portions contributes to defining a plurality of basic units, and
wherein the support portions are disposed at a predetermined interval.

8. The three-dimensional printing support device according to claim 1, further comprising:
a measuring unit configured to measure the shape of the installation surface,
wherein the control unit is configured to control the drive unit based on the shape of the installation surface measured by the measuring unit and on the shape data acquired by the control unit.

9. The three-dimensional printing support device according to claim 1,
wherein the surface portion has elasticity.

10. The three-dimensional printing support device according to claim 1,
wherein the surface portion includes a heat-resistant material.

11. The three-dimensional printing support device according to claim 1,
wherein the control unit is configured to determine the predetermined interval based on: (i) a target shape defined by the installation surface; and (ii) an error amount allowable in the shape of the printed article to be formed.

12. The three-dimensional printing support device according to claim 1, wherein the surface portion is defined as a film member.

13. The three-dimensional printing support device according to claim 1, wherein the surface portion includes a metal.

14. The three-dimensional printing support device according to claim 1, wherein the surface portion includes a resin.

15. The three-dimensional printing support device according to claim 1, wherein the surface portion includes a rubber.

16. The three-dimensional printing support device according to claim 1, wherein the surface portion is mesh-printed.

* * * * *